US012573805B2

(12) United States Patent
Yu et al.

(10) Patent No.: US 12,573,805 B2
(45) Date of Patent: Mar. 10, 2026

(54) GAIN ADJUSTER, GAIN ADJUSTMENT METHOD, AND OPTICAL LINE TERMINAL

(71) Applicant: Huawei Technologies Co., Ltd., Shenzhen (CN)

(72) Inventors: Yongze Yu, Dongguan (CN); Hengyun Jiang, Chengdu (CN); Yunfei Yan, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 945 days.

(21) Appl. No.: 17/836,775

(22) Filed: Jun. 9, 2022

(65) Prior Publication Data

US 2022/0344891 A1    Oct. 27, 2022

Related U.S. Application Data

(63) Continuation of application No. PCT/CN2020/115464, filed on Sep. 16, 2020.

(30) Foreign Application Priority Data

Dec. 13, 2019    (CN) .......................... 201911285050.8

(51) Int. Cl.
 *H01S 3/00* (2006.01)
 *H01S 3/094* (2006.01)
 (Continued)

(52) U.S. Cl.
 CPC ............ *H01S 3/1022* (2013.01); *H01S 3/094* (2013.01); *H01S 3/10007* (2013.01)

(58) Field of Classification Search
 CPC ..... H01S 3/1022; H01S 3/094; H01S 3/10007
 See application file for complete search history.

(56) References Cited

U.S. PATENT DOCUMENTS

| | | | |
|---|---|---|---|
| 5,195,160 A | 3/1993 | Byron | |
| 5,566,196 A | 10/1996 | Scifres | |

(Continued)

FOREIGN PATENT DOCUMENTS

| | | |
|---|---|---|
| CA | 2533478 A1 | 8/2006 |
| CN | 102508388 A | 6/2012 |

(Continued)

OTHER PUBLICATIONS

Seo, Y.S. et al., "Optical Amplification in a Bismuth-Doped Silica Glass at 1300 nm Telecommunications Window," Science Direct, Optics Communication, 266, 2006, 3 pages.

(Continued)

*Primary Examiner* — Mark Hellner
(74) *Attorney, Agent, or Firm* — Slater Matsil, LLP

(57) ABSTRACT

A gain adjuster, a gain adjustment method, and an optical line terminal are provided, to separately adjust a gain of a to-be-adjusted optical signal. The gain adjuster includes a light spot conversion component and a gain medium that are sequentially coupled. The gain adjuster further includes a pump laser. The light spot conversion component is configured to adjust light spot sizes of at least some optical signals in received optical signals to output a first optical signal transmitted in space. The pump laser is configured to excite the gain medium. The gain medium is configured to adjust a gain of the first optical signal to output a second optical signal.

19 Claims, 12 Drawing Sheets

(51) Int. Cl.
    *H01S 3/10*         (2006.01)
    *H01S 3/102*       (2006.01)

(56)            References Cited

U.S. PATENT DOCUMENTS

| | | |
|---|---|---|
| 6,301,037 B1 | 10/2001 | Fischer et al. |
| 6,339,495 B1 | 1/2002 | Cowle et al. |
| 6,885,499 B1 | 4/2005 | Hoshida et al. |
| 7,627,016 B2 | 12/2009 | Brown et al. |
| 7,911,684 B1 | 3/2011 | Chen |
| 9,025,627 B2 | 5/2015 | Miyanaga et al. |
| 9,160,136 B1 | 10/2015 | Bishop et al. |
| 10,008,821 B1 | 6/2018 | Goodno et al. |
| 10,297,972 B2 | 5/2019 | Qiao |
| 2002/0001321 A1 | 1/2002 | Perry |
| 2005/0100073 A1* | 5/2005 | Hughes, Jr. ......... H01S 3/06708 |
| | | 372/70 |
| 2007/0274364 A1 | 11/2007 | Brown et al. |
| 2016/0006207 A1 | 1/2016 | Clubley et al. |
| 2018/0069368 A1 | 3/2018 | Taira et al. |

FOREIGN PATENT DOCUMENTS

| | | | |
|---|---|---|---|
| CN | 102769245 A | 11/2012 | |
| CN | 103117504 A | 5/2013 | |
| CN | 203747233 U | 7/2014 | |
| CN | 104136984 A | 11/2014 | |
| CN | 105048270 A | 11/2015 | |
| CN | 105140773 A | 12/2015 | |
| CN | 206195144 U | 5/2017 | |
| CN | 107293934 A | 10/2017 | |
| CN | 107834353 A * | 3/2018 | .......... H01S 3/1022 |
| CN | 109149338 A * | 1/2019 | ....... H01S 3/094049 |
| CN | 109713555 A | 5/2019 | |
| CN | 110389451 A | 10/2019 | |
| CN | 209544803 U * | 10/2019 | .............. H01S 3/00 |
| EP | 0859435 A2 | 8/1998 | |
| EP | 1132766 A2 | 9/2001 | |
| EP | 2903185 A1 | 8/2015 | |
| IN | 103794973 A | 5/2014 | |
| JP | H10303819 A | 11/1998 | |
| TW | 201622278 A | 6/2016 | |

OTHER PUBLICATIONS

Seo, Y.S. et al., "Simultaneous Amplification at Two Wavelengths Near 1300 nm in a 6.5-cm-Long Bismuth-Doped Silica Glass," IEEE Photonics Technology Letter, vol. 18, No. 18, Sep. 15, 2006, 3 pages.

Yang, W.W.O., "All-Optical WDM/TDM Star-Bus Network using Optical Amplifiers," Journal of Optical Communication, vol. 16, No. 6, 1995, 11 pages.

Zhen, X. et al., "Numerical Simulation and Analysis for Gain Guiding Effect in Master Oscillator Power Amplifier Lasers," Chinese Journal of Lasers, vol. 38, No. 5, May 2011, 5 pages, (English Abstract).

\* cited by examiner

1

GAIN ADJUSTER, GAIN ADJUSTMENT METHOD, AND OPTICAL LINE TERMINAL

CROSS-REFERENCE TO RELATED APPLICATIONS

This application is a continuation of International Application No. PCT/CN2020/115464, filed on Sep. 16, 2020, which claims priority to Chinese Patent Application No. 201911285050.8, filed on Dec. 13, 2019. The disclosures of the aforementioned applications are hereby incorporated by reference in their entireties.

TECHNICAL FIELD

This application relates to the optical communications field, and in particular, to a gain adjuster, a gain adjustment method, and an optical line terminal.

BACKGROUND

In optical communication, an optical amplifier needs to be disposed to amplify a gain of an optical signal. An erbium-doped fiber amplifier (EDFA) is one type of optical amplifier.

A specific structure of the EDFA is that shown in FIG. 1. The EDFA includes an amplification unit 100. The amplification unit 100 specifically includes an isolator 101, a wavelength division multiplexer 102, a pump laser 103, and an erbium-doped fiber 104. The optical signal is incident to the wavelength division multiplexer 102 through the isolator 101. Pump light output by the pump laser 103 is multiplexed with the optical signal by using the wavelength division multiplexer 102. Then, a multiplexed signal is output to the erbium-doped fiber 104. The erbium-doped fiber 104 amplifies the gain of the optical signal. If a high-power EDFA is needed, a plurality of amplification units 100 need to be cascaded.

However, the EDFA uses an all-fiber structure and is poorly compatible with an optical component based on a space optical structure. In addition, to implement a purpose of amplifying the gain of the optical signal, power of the pump light output by the pump laser 103 needs to be increased. If gains of a plurality of channels of optical signals are amplified by using the single erbium-doped fiber 104, a gain of each channel of optical signal cannot be separately adjusted under excitation of the pump light.

SUMMARY

Embodiments of the present invention provide a gain adjuster, a gain adjustment method, and an optical line terminal, to resolve a technical problem of separately adjusting a gain of a to-be-adjusted optical signal.

According to a first aspect, an embodiment of the present invention provides a gain adjuster, including a light spot conversion component and a gain medium that are sequentially coupled. The gain adjuster further includes a pump laser. The light spot conversion component is configured to adjust light spot sizes of at least some optical signals in received optical signals to output a first optical signal transmitted in space. The pump laser is configured to excite the gain medium. The gain medium is configured to adjust a gain of the first optical signal to output a second optical signal.

According to a second aspect, an embodiment of the present invention provides a gain adjustment method. The method is applied to a gain adjuster. The gain adjuster includes a light spot conversion component and a gain medium that are sequentially coupled. The gain adjuster further includes a pump laser. The method includes: The light spot conversion component adjusts light spot sizes of at least some optical signals in received optical signals to output a first optical signal transmitted in space. The pump laser excites the gain medium. The gain medium adjusts a gain of the first optical signal to output a second optical signal.

According to a third aspect, an embodiment of the present invention provides an optical line terminal using a gain adjuster. The optical line terminal includes the gain adjuster according to the first aspect. The gain adjuster is connected to a passive optical splitter through a feeder fiber. The gain adjuster is configured to adjust a gain of a received optical signal. An optical signal on which gain adjustment needs to be performed in this aspect is specifically described as the to-be-adjusted optical signal in the first aspect. Details are not described again.

According to a fourth aspect, an embodiment of the present invention provides a wavelength selective switch. The wavelength selective switch includes an optical fiber array, a deflection processing component, a reflection component, a lens component, a demultiplexing/multiplexing component, a liquid crystal on silicon panel, and a gain adjuster. The gain adjuster is disposed before an optical path of the liquid crystal on silicon panel, or the gain adjuster is disposed behind an optical path of the liquid crystal on silicon panel. For specific description of the gain adjuster, refer to the first aspect for details. Details are not described again.

DETAILED DESCRIPTION OF ILLUSTRATIVE EMBODIMENTS

To make the objectives, technical solutions, and advantages of the present invention clearer and more comprehensible, the following further describes the present invention in detail with reference to the accompanying drawings and embodiments. It should be understood that the specific embodiments described herein are merely used to explain the present invention, but are not intended to limit the present invention. It is clear that the described embodiments are merely some but not all of embodiments of the present invention. All other embodiments obtained by persons of ordinary skill in the art based on embodiments of the present invention without creative efforts shall fall within the protection scope of the present invention.

This application provides a gain adjuster. The gain adjuster is configured to adjust a gain of an optical signal. For example, the gain of the optical signal may be amplified. For another example, the gain of the optical signal may be reduced. To better understand the gain adjuster provided in this application, the following describes a scenario to which the gain adjuster is applied. It should be noted that the following description for the scenario to which the gain adjuster is applied is an optional example. This is not limited.

Figure 2:
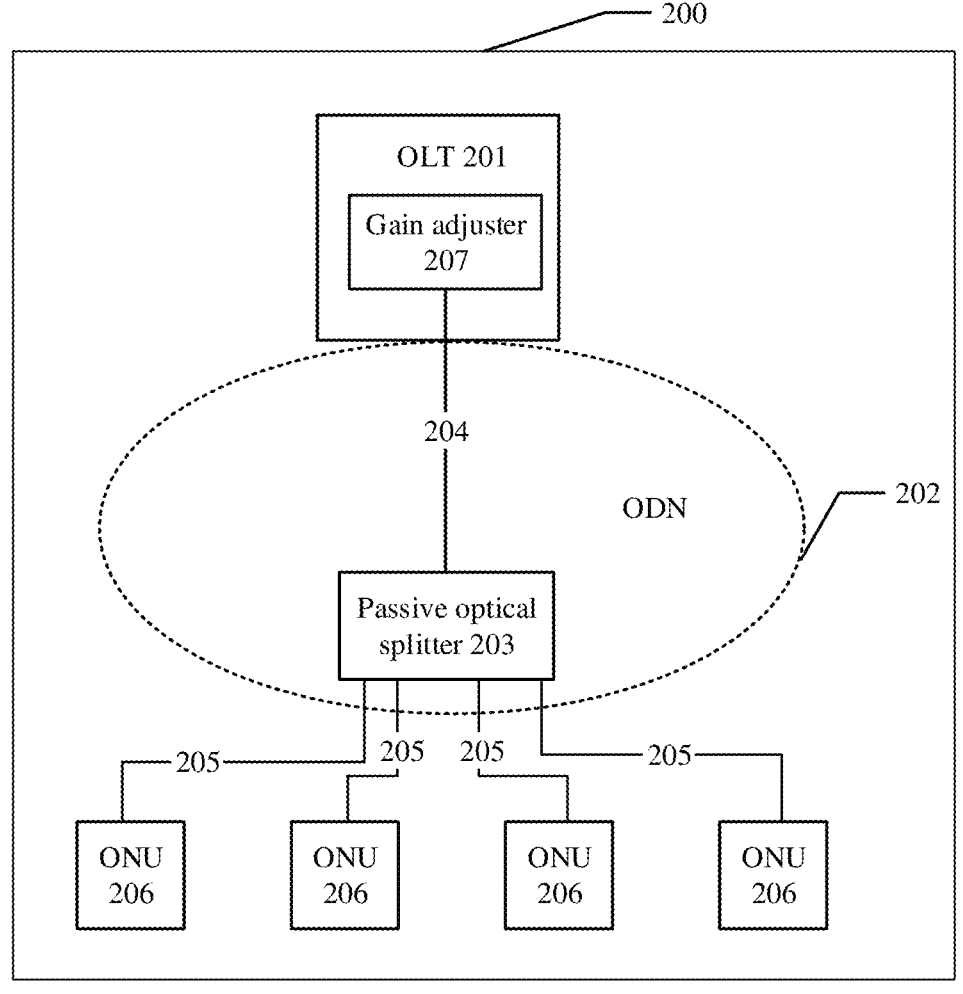
FIG. 2 is a diagram of an example of network architecture of a passive optical network.

Scenario 1:

The gain adjuster shown in this application is applied to a passive optical network (PON) 200 shown in FIG. 2. The PON 200 includes an optical line terminal (OLT) 201. The OLT 201 is configured to connect to a network-side device (for example, a switch or a router) at an upper layer, and connect to one or more optical distribution networks (ODNs) 202 at a lower layer. The ODN 202 includes a passive optical splitter 203 for optical power allocation, a feeder fiber 204 connected between the passive optical splitter 203 and the OLT 201, and a distribution fiber 205 connected between the passive optical splitter 203 and an optical network unit (ONU) 206.

When transmitting downlink service data, the ODN 202 transmits an optical signal from the OLT 201 to each ONU 206 by using the passive optical splitter 203. The optical signal from the OLT 201 is used to carry the downlink service data. When transmitting uplink service data, the ODN 202 aggregates and transmits an optical signal from the ONU 206 to the OLT 201. The optical signal from the ONU 206 is used to carry the uplink service data.

In this scenario, the gain adjuster 207 may be disposed inside the OLT 201 and connected to the feeder fiber 204. The gain adjuster 207 is configured to adjust a gain of one or more channels of optical signals.

It should be noted that description of a structure of the PON 200 and a position for disposing the gain adjuster in this scenario is an optional example. This is not limited. For example, the gain adjuster 207 may be alternatively disposed outside the OLT 201 and connected between the OLT 201 and the feeder fiber 204, provided that the gain adjuster 207 included in the PON 200 can implement a purpose of adjusting the gain of the optical signal.

Figure 3:
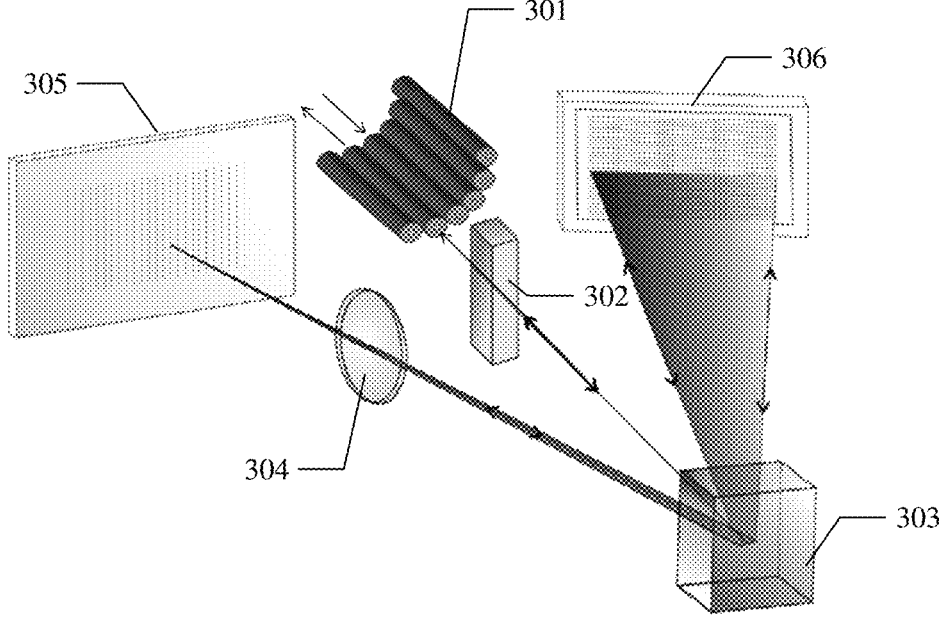
FIG. 3 is a diagram of an example of a structure of a wavelength selective switch.

Scenario 2:

The gain adjuster shown in this application is applied to a wavelength selective switch (WSS) of a liquid crystal on silicon (LCoS) shown in FIG. 3.

As shown in FIG. 3, the LCoS-based WSS mainly includes an optical fiber array 301 used for input and output, a deflection processing component 302 used for deflection processing, a reflection component 303 used for light reflection, a lens component 304 used for light focusing, a demultiplexing/multiplexing component 305 used for demultiplexing and multiplexing, and an LCoS panel 306 used for optical path deflection and port switching.

Optionally, the WSS may further include a collimator array that is located behind the optical fiber array 301 and that is configured to collimate light. Collimation is to convert divergent light into collimated light. Optionally, the deflection processing component 302 may include beam deformation and polarization conversion components, so that a light spot forms a required shape and enters an optical path at a specific angle. Optionally, the lens component 304 may be one lens or a combination of a plurality of lenses. A redirected optical path enables the optical path to meet a size limitation of an actual component.

A randomly polarized beam incident from the optical fiber collimator array is first converted into linearly polarized light by using the polarization conversion component, and then is incident to the demultiplexing/multiplexing component 305 after beam extension performed by the lens component 304. The linearly polarized light is diffracted and then incident to different regions on the LCoS panel 306 by using the lens component 304. Liquid crystal phases in different regions on the LCoS panel 306 are controlled to separately control reflection directions of light with different wavelengths. Then, the light is reflected and then input to an output port of the collimator array through the lens component 304, the demultiplexing/multiplexing component 305, and the deflection processing component 302.

In this scenario, the gain adjuster is disposed before the optical path of the LCoS panel 306, and the gain adjuster is configured to adjust a gain of an optical signal input to the LCoS panel 306. Optionally, the gain adjuster may be alternatively disposed behind the optical path of the LCoS panel 306, and the gain adjuster is configured to adjust a gain of an optical signal output by the LCoS panel 306.

It should be noted that description of a structure of the WSS and a position for disposing the gain adjuster in this scenario is an optional example, provided that the gain adjuster included in the WSS can implement a purpose of adjusting a gain of an optical signal. This is not limited.

Figure 4:
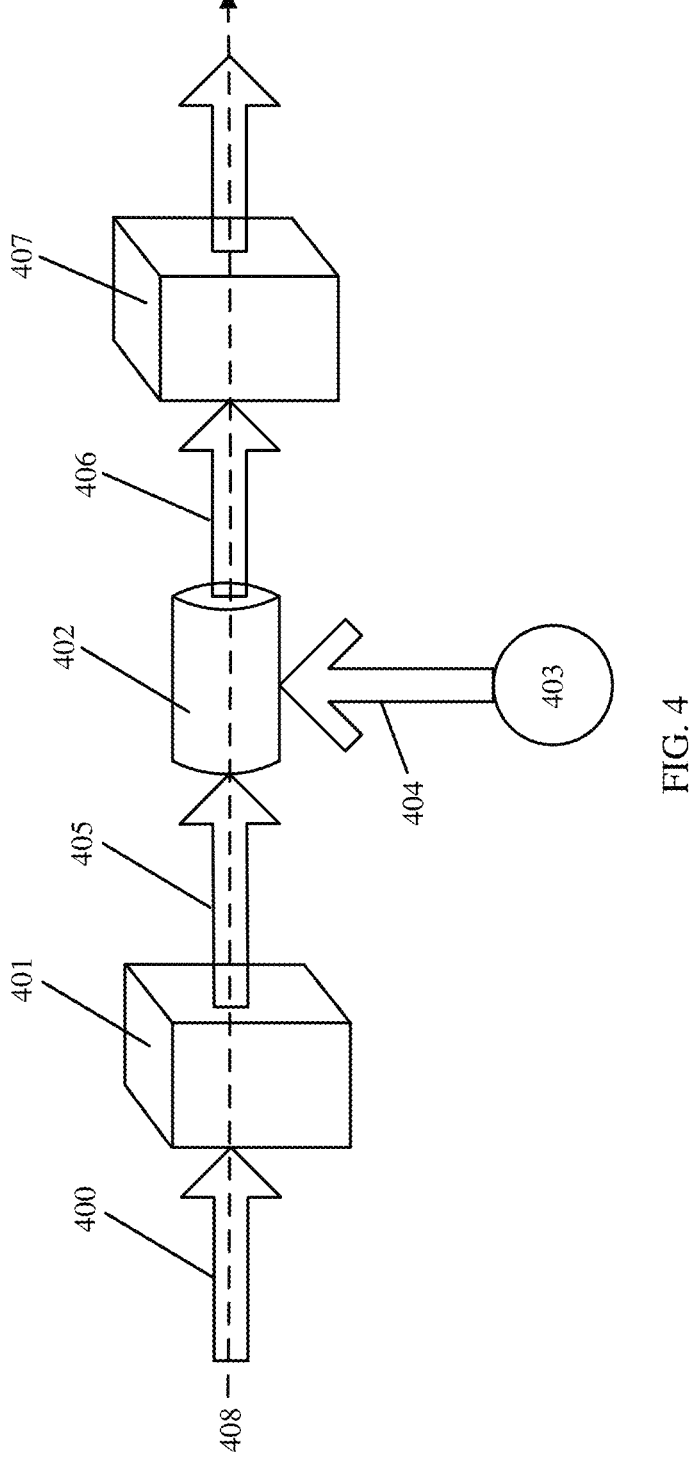
FIG. 4 is a diagram of an example of a first embodiment of a gain adjuster according to embodiments of this application.

With reference to FIG. 4, the following first provides example description of a structure of the gain adjuster provided in this application.

The gain adjuster shown in this embodiment specifically includes: a light spot conversion component 401 and a gain medium 402 that are successively coupled. It should be noted that "coupling" shown in this embodiment indicates a connection on an optical path. Persons skilled in the art may understand that a specific optical component may not necessarily have a physical connection relationship of substantial contact. A connection relationship on an optical path is formed due to spatial positions of the optical components and component features of the optical components.

Specifically, the gain adjuster obtains the to-be-adjusted optical signal 400 by using the light spot conversion component 401. The gain adjuster shown in this embodiment is configured to adjust a gain magnitude of the to-be-adjusted optical signal 400.

In this embodiment, the light spot conversion component 401 and the gain medium 402 are successively disposed in a transmission direction of an optical axis 408 of the to-be-adjusted optical signal 400. The optical axis 408 of the to-be-adjusted optical signal 400 is a central line of the to-be-adjusted optical signal 400 shown in FIG. 4. This embodiment does not limit a quantity of channels of to-be-adjusted optical signals 400. For example, the gain adjuster may obtain one or more channels of to-be-adjusted optical signals 400.

In this embodiment, the light spot conversion component 401 is configured to output a first optical signal 405 transmitted in space. The light spot conversion component 401 may further collimate the first optical signal 405, and then output the collimated first optical signal 405 to the gain medium 402.

A specific component type of the light spot conversion component 401 is not limited in this embodiment, provided that the light spot conversion component 401 can adjust a light spot size. For example, the light spot conversion component 401 may be a zoom collimator, a microlens array, or the like. In this embodiment, an example in which the light spot conversion component 401 is a lens is used for description.

The gain adjuster further includes a pump laser 403. The pump laser 403 is configured to output pump light 404 to the gain medium 402. A specific position of disposing the pump laser 403 is not limited in this embodiment, provided that the pump laser 403 can output the pump light 404 to the gain medium 402 to implement excitation on the gain medium 402 based on the pump light 404.

In this embodiment, when the light spot conversion component 401 has received an optical signal, the light spot conversion component 401 may adjust light spot sizes of at least some received optical signals. A specific example is as follows:

For example, the gain medium 402 may be disposed in a transmission direction of an optical axis of the pump light 404, so that the pump laser 403 can directly output the pump light 404 to the gain medium 402. For the transmission direction of the optical axis of the pump light 404, refer to the foregoing description of the transmission direction of the optical axis 408 of the to-be-adjusted optical signal 400. Details are not described.

In this example, because the pump light 404 is not transmitted by using the light spot conversion component 401, the optical signal received by the light spot conversion component 401 is only a to-be-adjusted optical signal; and the light spot conversion component 401 is configured to adjust only a light spot size of the to-be-adjusted optical signal 400 to output the first optical signal 405.

For another example, the pump laser 403 may indirectly output the pump light 404 to the gain medium 402 through another component (for example, a multiplexer).

In this example, because the pump light 404 is not transmitted by using the light spot conversion component 401, the optical signal received by the light spot conversion component 401 is the to-be-adjusted optical signal and the pump light 404; and the light spot conversion component 401 may adjust only a light spot size of the received pump light 404 to output the first optical signal 405.

For another example, when the optical signal received by the light spot conversion component 401 is only a to-be-adjusted optical signal and the pump light 404, the light spot conversion component 401 may be configured to adjust a light spot size of the to-be-adjusted optical signal 400 and a light spot size of the pump light 404 to output the first optical signal 405.

Specifically, the gain medium 402 is a glass material or a crystal material doped with a rare-earth element or a main-group element. For example, the element doped in the gain medium 402 may be one or more types of the following: rare-earth ions, bismuth (Bi) ions, erbium (Er) ions, praseodymium (Pr) ions, and thulium (Tm) ions. This embodiment does not limit a specific material of the gain medium 402.

Under the excitation based on the pump light 404, the gain medium 402 shown in this embodiment is configured to adjust a gain of the obtained first optical signal 405 to output a second optical signal 406. The gain medium 402 shown in this embodiment performs gain adjustment based on a light spot size of the first optical signal 405 to output the second optical signal 406. For example, a positive correlation exists between the light spot size of the first optical signal 405 and a gain magnitude of the second optical signal 406. In other words, a greater light spot size of the first optical signal 405 corresponds to a greater gain of the second optical signal 406 that is adjusted by the gain medium 402. For another example, a negative correlation exists between the light spot size of the first optical signal 405 and a gain magnitude of the second optical signal 406. In other words, a greater light spot size of the first optical signal 405 corresponds to a smaller gain of the second optical signal 406 that is adjusted by the gain medium 402. Details are not limited in this embodiment.

The second optical signal 406 output by the gain medium 402 may be shaped and collimated by a light spot conversion component 407 and output to free space or an optical fiber. The light spot conversion component 407 shown in this embodiment is an optional structure. In another example, the second optical signal 406 output by the gain medium 402 may also be directly output to free space or an optical fiber.

The following describes beneficial effects of the gain adjuster shown in this embodiment.

Figure 1:
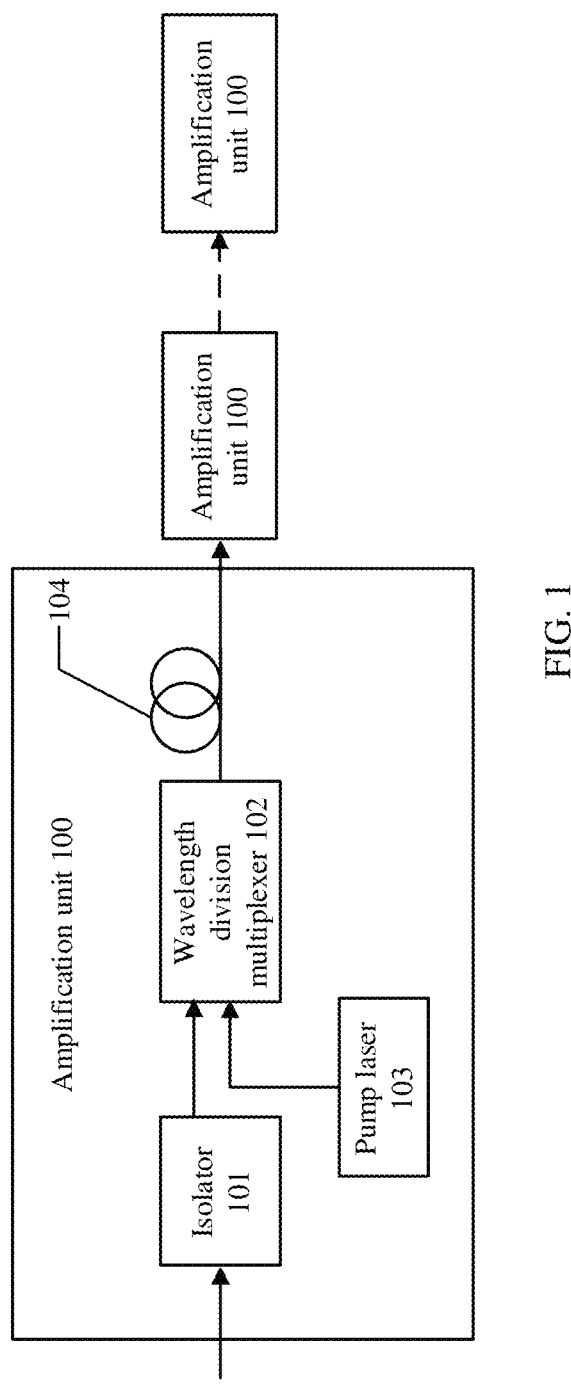
FIG. 1 is a diagram of an example of a structure of an erbium-doped fiber amplifier according to the existing solutions.

First, in the existing solution shown in FIG. 1, to adjust the gain of the optical signal, power of the pump light output by the pump laser 103 needs to be adjusted to amplify the gain of the optical signal. In this embodiment, the light spot size of the first optical signal 405 is controlled to freely adjust the gain magnitude of the output second optical signal 406. It can be learned that the gain is adjusted based on a light spot size. In this way, noise for the gain adjustment can be effectively reduced.

In addition, if the gain adjuster shown in this embodiment obtains the plurality of channels of to-be-adjusted optical signals 400, the gain adjuster may separately adjust a gain of each of the plurality of channels of to-be-adjusted optical signal 400. Specifically, the light spot conversion component 401 may separately adjust the light spot size of each channel of a to-be-adjusted optical signal 400 to output a plurality of channels of first optical signals 405. The gain medium 402 may also adjust the gain magnitude of each channel of a first optical signal 405 based on the light spot size of each channel of a first optical signal 405 to output a plurality of channels of second optical signals 406.

It can be learned that the gain adjuster shown in this embodiment separately effectively adjusts the gains of the plurality of channels of to-be-adjusted optical signals 400. For example, the gain adjuster may perform gain amplification adjustment on all the plurality of channels of first optical signals 405. Specifically, the gain adjuster may amplify gains of different first optical signals 405 in different degrees, for example, amplify gains of some first optical signals 405 by 40%, and amplify gains of the other first optical signals 405 by 20%. For another example, the gain adjuster may perform gain reduction adjustment on all the plurality of channels of first optical signals 405. For a specific adjustment example, refer to an example of the gain amplification. Details are not described. For another example, the gain adjuster may perform gain amplification adjustment on some of the plurality of channels of first optical signals 405, and perform gain reduction adjustment on some of the plurality of channels of first optical signals 405. Description of a specific adjustment process is an optional example. This is not limited.

As shown in FIG. 1, the power of the pump light output by the pump laser 103 is adjusted to implement a solution of amplifying the gain of the optical signal. This cannot separately adjust the gains of the plurality of channels of optical signals. When no component needs to be added, the gain adjuster shown in this embodiment can separately adjust the gains of the to-be-adjusted optical signals 400, which effectively reduces the costs and a volume of the gain adjustment component and further effectively improves a pooling adjustment capability of adjusting the gains of the plurality of channels of to-be-adjusted optical signals 400. It can be learned that the gain is adjusted based on a light spot size to effectively and flexibly adjust the gains of the plurality of channels of first optical signals.

Further, it can be learned from the foregoing description that both the first optical signal 405 and the second optical signal 406 shown in this embodiment are transmitted in free space. In other words, transmission does not need to be performed by using a medium such as an optical fiber in a process of transmitting the first optical signal 405 from the light spot conversion component 401 to the gain medium 402 and in a process of transmitting the second optical signal 406 from the gain medium 402 to the light spot conversion component 407. It can be learned that the gain adjuster shown in this embodiment can be well compatible with an optical component designed based on space optics. The optical component designed based on space optics may be an LCOS-based WSS component, a micro electro mechanical system (MEMS)-based adjustable optical attenuator (VOA), or the like. The optical component designed based on space optics generally has a relatively large insertion loss. When the optical component designed based on space optics is well compatible with the gain adjuster shown in this embodiment, a power budget of an optical link is effectively reduced and subsequent improvement of a rate of an optical signal can be met, thereby effectively improving network performance and effectively extending a network transmission bandwidth.

Further, a type of gain medium can be flexibly selected for the gain adjuster shown in this embodiment. For example, different types of gain media can be selected based on different types of bands to which the gain adjuster is applied, to increase a quantity of bands to which the gain adjuster can be applied. For example, if the gain adjuster is applied to an O band, a type of gain medium may be a gain medium doped with Bi ions and/or Pr ions. For another example, if the gain adjuster is applied to a C band and/or an L band, a type of gain medium may be a gain medium doped with Er ions. For another example, if the gain adjuster is applied to an S band, a type of gain medium may be a gain medium doped with Tm ions.

Figure 5:
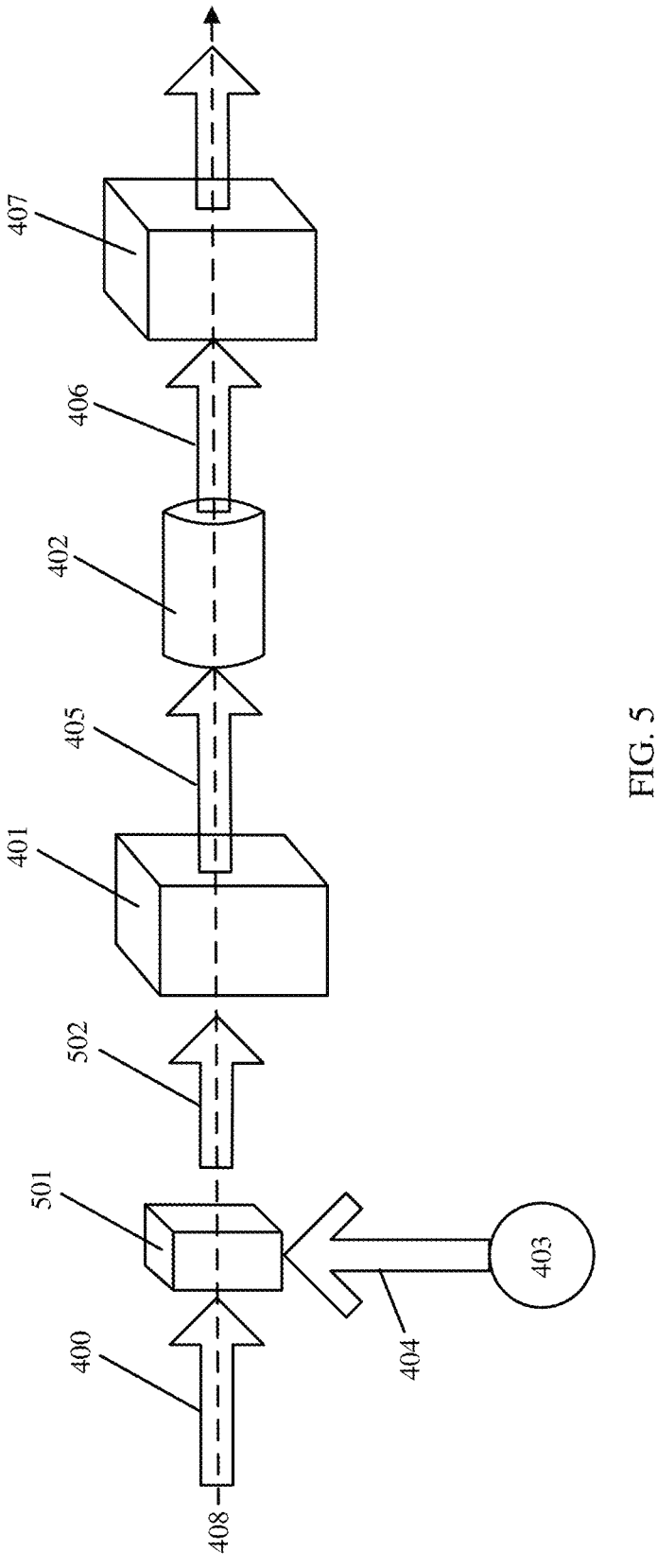
FIG. 5 is a diagram of an example of a second embodiment of a gain adjuster according to embodiments of this application.

The following describes another embodiment of the gain adjuster shown in this application based on FIG. 5. Specifically, in this embodiment, a negative correlation exists between the light spot size of the pump light 404 and the gain magnitude of the second optical signal 406.

In this embodiment, in the transmission direction of the optical axis 408 of the to-be-adjusted optical signal 400, a multiplexer 501, the light spot conversion component 401, the gain medium 402, and the light spot conversion component 407 are sequentially disposed. For specific description of the light spot conversion component 401, the gain medium 402, and the light spot conversion component 407, refer to FIG. 4 for details. Details are not described again. The multiplexer 501 is further disposed in the transmission direction of the optical axis of the pump light 404. For description of the pump light 404 and the pump laser 403, refer to FIG. 4. Details are not described again. It can be learned that the multiplexer 501 shown in this embodiment is separately coupled to the light spot conversion component 401 and the pump laser 403.

A specific component type of the multiplexer 501 is not limited in this embodiment, provided that the multiplexer 501 can enable that optical signals in different directions spatially overlap. This embodiment is described by using an example in which the multiplexer 501 is a dichroic mirror.

When the multiplexer 501 receives the to-be-adjusted optical signal 400 and the pump light 404, the multiplexer 501 may perform multiplexing on the to-be-adjusted optical signal 400 and the pump light 404 to output a multiplexed optical signal 502. To adjust the light spot size of the to-be-adjusted optical signal 400 and the light spot size of the pump light 404, an optical axis of the to-be-adjusted optical signal 400 included in the multiplexed optical signal 502 overlaps an optical axis of the pump light 404 included in the multiplexed optical signal 502.

When receiving the multiplexed optical signal 502, the light spot conversion component 401 may adjust the light spot size of the multiplexed optical signal 502 to output the first optical signal 405. The following optionally describes an adjustment manner.

Manner 1

The light spot conversion component 401 is configured to adjust both the light spot size of the to-be-adjusted optical signal 400 and the light spot size of the pump light 404. Specifically, the light spot conversion component 401 adjusts the light spot size of the to-be-adjusted optical signal 400 to a first light spot size, and the light spot conversion component 401 further adjusts the light spot size of the pump light 404 to a second light spot size.

Specifically, the light spot conversion component 401 may set a corresponding preset focal length for optical signals with different wavelengths, and adjust, based on the preset focal length, a light spot size of an optical signal corresponding to the preset focal length. Specifically, in this example, the first light spot size and the second light spot size that are adjusted based on the preset focal length may be the same or different. This is not limited in this embodiment. In this embodiment, an example in which the first light spot size is the same as the second light spot size is used for description.

Manner 2

The light spot conversion component 401 adjusts only the light spot size of the pump light 404 included in the multiplexed optical signal 502.

In this embodiment, the light spot conversion component 401 adjusts both the light spot size of the to-be-adjusted optical signal 400 and the light spot size of the pump light

404, and then outputs the first optical signal 405. The gain medium 402 adjusts the gain of the first optical signal 405 to output the second optical signal. A negative correlation exists between the gain magnitude of the second optical signal and the light spot size of the pump light 404. It can be learned that a greater light spot of the pump light 404 that is adjusted by the light spot conversion component 401 corresponds to a smaller gain of the second optical signal 406 output by the gain medium 402.

Figure 6:
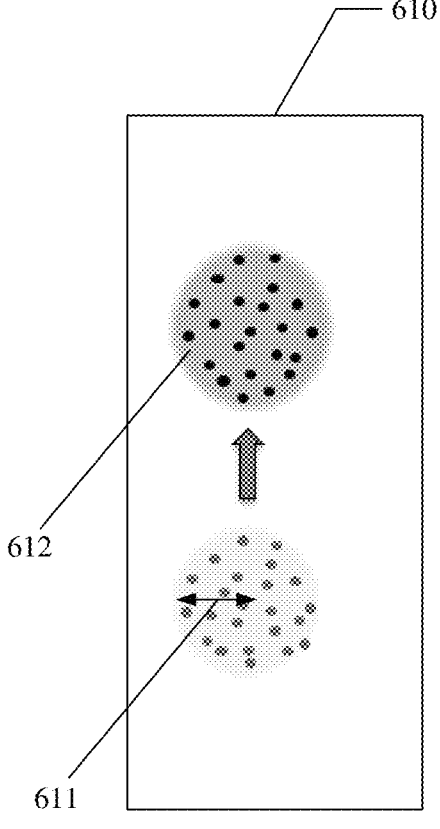
FIG. 6 is a diagram of an example of a first gain adjustment principle according to embodiments of this application.
Figure 6:
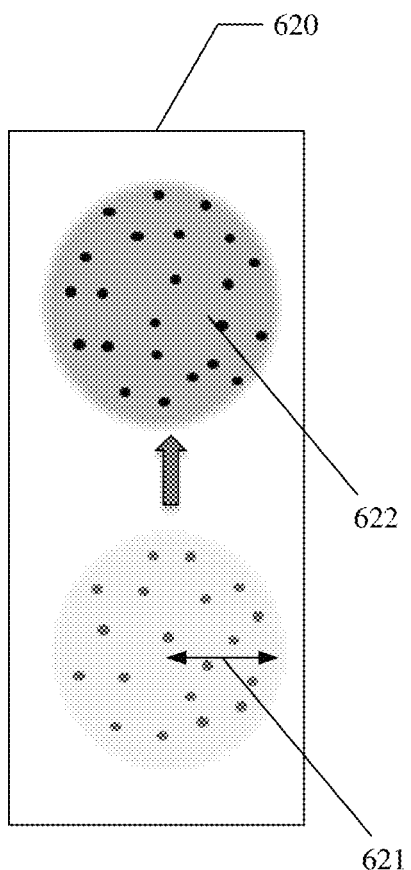

To better understand this embodiment, the following describes an example of the gain adjustment principle shown in this embodiment with reference to FIG. 6. FIG. 6 shows two example adjustment modes, that is, an adjustment mode 610 and an adjustment mode 620.

In the adjustment mode 610, the light spot conversion component 401 has a first preset focal length. The first preset focal length is used to adjust a radius 611 of a light spot of an optical signal corresponding to the first preset focal length to 4 microns (μm). Pump power of the pump laser 403 is 750 milliwatts (mW). After receiving the multiplexed optical signal 502, the light spot conversion component 401 may adjust both a radius of the light spot of the to-be-adjusted optical signal 400 and a radius of the light spot of the pump light 404 to 4 μm.

The light spot size of the pump light 404 determines a total ion inversion rate of a gain adjustment region. In this embodiment, for example, ions doped in the gain medium 402 are Er ions. It can be learned that the light spot size of the pump light 404 determines an inversion rate of the Er ions in the gain adjustment region. The gain adjustment region is an overlapping region of the to-be-adjusted optical signal 400 and the pump light 404 in the gain medium 402. The gain medium 402 adjusts the gain of the second optical signal 406 by using the gain adjustment region.

The following describes a relationship between the light spot size of the pump light 404 and the ion inversion rate of the gain adjustment region.

It can be further learned from the adjustment mode 610 that, when the radius of the light spot of the to-be-adjusted optical signal 400 and the radius of the light spot of the pump light 404 are both 4 μm, the inversion rate of the Er ions in the gain adjustment region 612 is maintained at a relatively high level. For example, the inversion rate of the Er ions in the gain adjustment region is 99%. In this case, a signal gain of the second optical signal 406 output by the gain medium 402 is 11.9 dB.

In the adjustment mode 620, the light spot conversion component 401 has a second preset focal length. The second preset focal length is used to adjust a radius 621 of a light spot of an optical signal corresponding to the second preset focal length to 14 μm. Pump power of the pump laser 403 is 750 mW. After receiving the multiplexed optical signal 502, the light spot conversion component 401 may adjust both the radius of the light spot of the to-be-adjusted optical signal 400 and the radius of the light spot of the pump light 404 to 14 μm. When the radius of the light spot of the to-be-adjusted optical signal 400 and the radius of the light spot of the pump light 404 are both 14 μm, the inversion rate of the Er ions in the gain adjustment region 622 is maintained at a relatively low level. For example, the inversion rate of the Er ions in the gain adjustment region is 90%. In this case, the signal gain of the second optical signal 406 output by the gain medium 402 is 2.1 dB.

A positive correlation exists between a value of the inversion rate of the Er ions in the gain adjustment region and the gain magnitude adjusted by the gain medium 402. In other words, a greater inversion rate of the Er ions in the gain adjustment region corresponds to a greater gain adjusted by the gain medium 402. It can be learned from comparison between the adjustment mode 610 and the adjustment mode 620 that the gain of the second optical signal 406 output by the gain medium 402 in the adjustment mode 610 is greater than the gain of the second optical signal 406 output by the gain medium 402 in the adjustment mode 620. It can be learned that a negative correlation exists between the light spot size of the pump light 404 and the gain magnitude of the second optical signal 406.

The gain adjuster shown in this embodiment may adjust the light spot size of the pump light 404 to freely adjust the gain of the second optical signal. In addition, gain adjustment is implemented based on the light spot size of the pump light 404 to effectively reduce noise for the gain adjustment and effectively implement control on the gain of the to-be-adjusted optical signal.

Figures 7, 8:
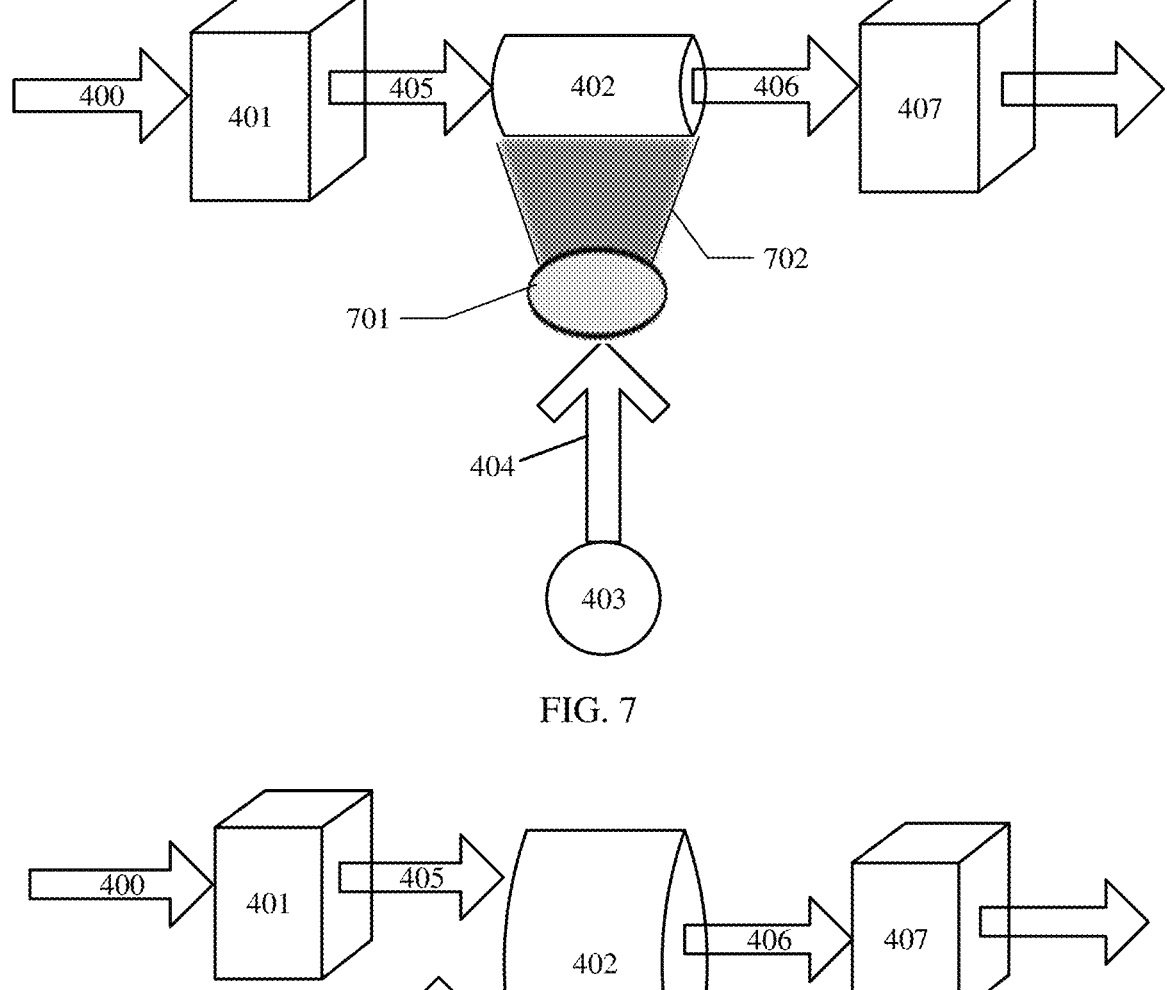
FIG. 7 is a diagram of an example of a third embodiment of a gain adjuster according to embodiments of this application.
FIG. 8 is a diagram of an example of a fourth embodiment of a gain adjuster according to embodiments of this application.

The following describes another embodiment of the gain adjuster shown in this application based on FIG. 7. Specifically, in this embodiment, a positive correlation exists between the light spot size of the first optical signal and the gain magnitude of the second optical signal.

Specifically, as shown in FIG. 7, the gain adjuster specifically includes the light spot conversion component 401, the gain medium 402, the light spot conversion component 407, and the pump laser 403. For specific description, refer to FIG. 4 for details. Details are not described again.

In this embodiment, the pump laser 403 is located in a region opposite to a side face of the gain medium 402. In other words, a light spot shaping component 701 and the gain medium 402 are sequentially disposed in the transmission direction of the pump light 404. A specific component type of the light spot shaping component 701 is not limited in this embodiment, provided that the light spot shaping component 701 can shape the pump light 404 to form the shaped pump light. For example, the light spot shaping component 701 may be a lens or a lens group.

The shaped pump light forms a pump light radiation region 702. In this embodiment, the light spot size of the pump light 404 does not need to be adjusted, provided that the gain medium 402 is located in the pump light radiation region 702 formed by the shaped pump light. When the gain medium 402 is located in the pump light radiation region 702, the pump light 404 with a current light spot size can be used to effectively excite the gain medium 402.

It should be noted that the light spot shaping component 701 shown in this embodiment is an optional structure. In another example, the pump light may be alternatively directly incident to the gain medium 402.

It should further be noted that, that the pump light 404 is used to perform side-face excitation on the gain medium 402 is used as an example in this embodiment. The side face of the gain medium 402 is a peripheral face of the gain medium 402 with a three-dimensional structure. The three-dimensional structure may be a cylinder structure, a square column structure, or the like. This is not specifically limited in this embodiment. For example, as shown in FIG. 7, if the gain medium 402 has a cylinder structure, that the pump light 404 is used to perform side-face excitation on the gain medium 402 indicates that the pump light 404 is incident on the side face of the gain medium 402 to perform side-face excitation on the gain medium 402.

In another example, as shown in FIG. 8, the pump laser 403 is located in a region opposite to an end face of the gain medium 402. The pump light 404 is used to perform end-face excitation on the gain medium 402. That the pump light 404 is used to perform end-face excitation on the gain medium 402 indicates that the pump light 404 is incident on the end face 801 of the gain medium 402 toward the light spot conversion component 401.

As shown in FIG. 8, for example, the light spot shaping component is not disposed between the pump laser 403 and the gain medium 402. In another example, the light spot shaping component may be alternatively disposed between the pump laser 403 and the gain medium 402. For specific description of the light spot shaping component, refer to FIG. 7 for details. Details are not described again.

Figure 9:
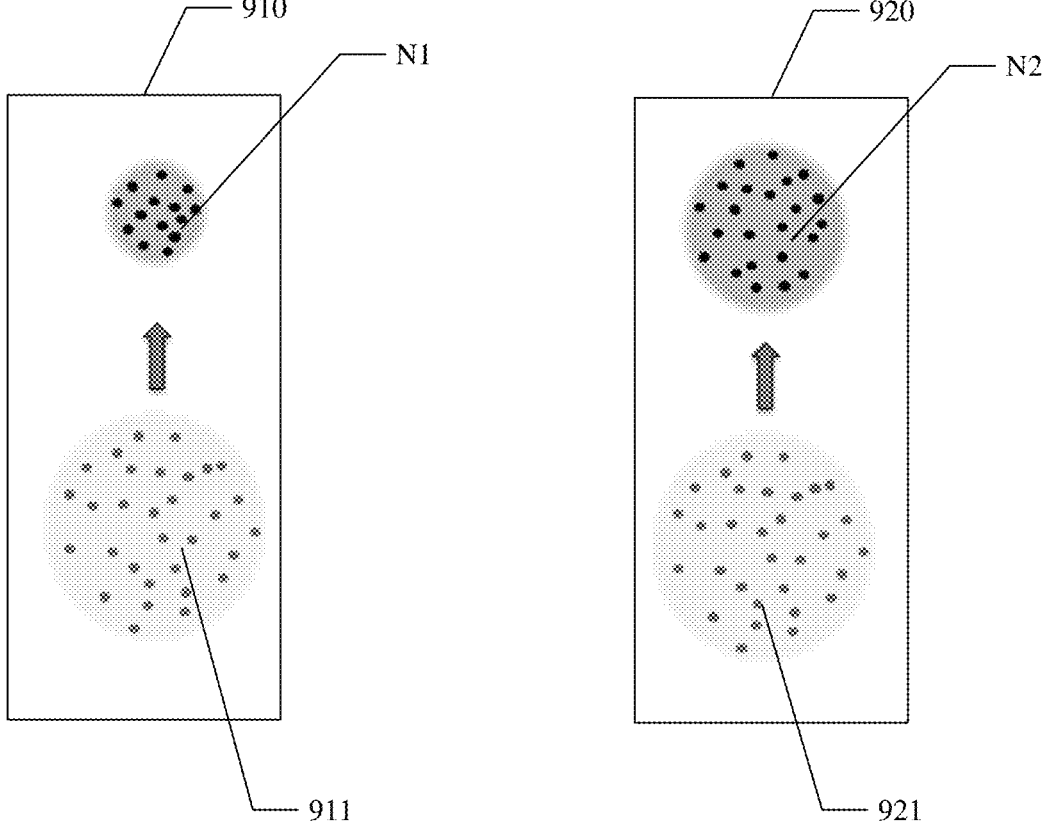
FIG. 9 is a diagram of an example of a second gain adjustment principle according to embodiments of this application.

It can be learned that because the light spot size of the pump light 404 shown in this embodiment is not adjusted, the gain magnitude of the second optical signal 406 may be adjusted through adjusting the light spot size of the to-be-adjusted optical signal 400. To better understand this embodiment, the following describes an example of the gain adjustment principle shown in this embodiment with reference to FIG. 9. FIG. 9 shows two example adjustment modes, that is, an adjustment mode 910 and an adjustment mode 920.

With reference to FIG. 6 and FIG. 9, it can be learned that the magnitude of the inversion rate of the Er ions in the gain adjustment region of the gain medium 402 depends on the light spot size of the pump light 404. Because the light spot conversion component 401 shown in this embodiment does not adjust the light spot size of the pump light 404, it can be learned that the light spot size of the pump light 404 remains unchanged, and consequently, the inversion rate of the Er ions in the gain adjustment region remains unchanged. In other words, as shown in FIG. 9, the inversion rate 911 of the Er ions in the gain adjustment region in the adjustment mode 910 is equal to the inversion rate 921 of the Er ions in the gain adjustment region in the adjustment mode 920.

However, a value of a quantity of stimulated and radiated Er ions in the gain adjustment region depends on the light spot size of the first optical signal 405, and a positive correlation exists between the value of the quantity of stimulated and radiated Er ions in the gain adjustment region and the light spot size of the first optical signal 405.

For example, in the adjustment mode 910, the light spot conversion component 401 has a first preset focal length. For description of the first preset focal length, refer to FIG. 6 for details. Details are not described again. In this case, pump power of the pump laser 403 is 750 mW. After receiving the to-be-adjusted optical signal 400, the light spot conversion component 401 may adjust the radius of the light spot of the to-be-adjusted optical signal 400 to 4 μm to output the first optical signal 405. In this case, the quantity of stimulated and radiated Er ions in the gain adjustment region is N1.

In the adjustment mode 920, the light spot conversion component 401 has a second preset focal length. For description of the second preset focal length, refer to FIG. 6 for details. Details are not described again. In this case, pump power of the pump laser 403 is 750 mW. After receiving the to-be-adjusted optical signal 400, the light spot conversion component 401 may adjust the radius of the light spot of the to-be-adjusted optical signal 400 to 14 μm to output the first optical signal 405. In this case, the quantity of stimulated and radiated Er ions in the gain adjustment region is N2, where N2 is greater than N1.

The gain magnitude adjusted in the gain adjustment region depends on the quantity of stimulated and radiated Er ions in the gain adjustment region. A positive correlation exists between the gain magnitude adjusted in the gain adjustment region and the value of the quantity of stimulated and radiated Er ions in the gain adjustment region.

In conclusion, a positive correlation exists among the gain magnitude adjusted in the gain adjustment region, the value of the quantity of stimulated and radiated Er ions in the gain adjustment region, and the light spot size of the first optical signal 405.

It can be learned that if the gain of the to-be-adjusted optical signal 400 needs to be increased, the light spot conversion component 401 may increase the light spot size of the to-be-adjusted optical signal 400 to output the first optical signal 405. If the gain of the to-be-adjusted optical signal 400 needs to be reduced, the light spot conversion component 401 may reduce the light spot size of the to-be-adjusted optical signal 400 to output the first optical signal 405. Further, it can be learned that a positive correlation exists between the light spot size of the first optical signal 405 and the gain magnitude of the second optical signal 406.

The gain adjuster shown in this embodiment may adjust the light spot size of the to-be-adjusted optical signal 400 to freely adjust the gain of the second optical signal. In addition, gain adjustment is implemented based on the light spot size of the to-be-adjusted optical signal 400, to effectively reduce noise for the gain adjustment and effectively implement control on the gain of the optical signal. In addition, in a gain adjustment process of the gain medium, the inversion rate of the Er ions in the gain adjustment region remains unchanged. In this case, a noise factor (NF) does not deteriorate.

Figure 10:
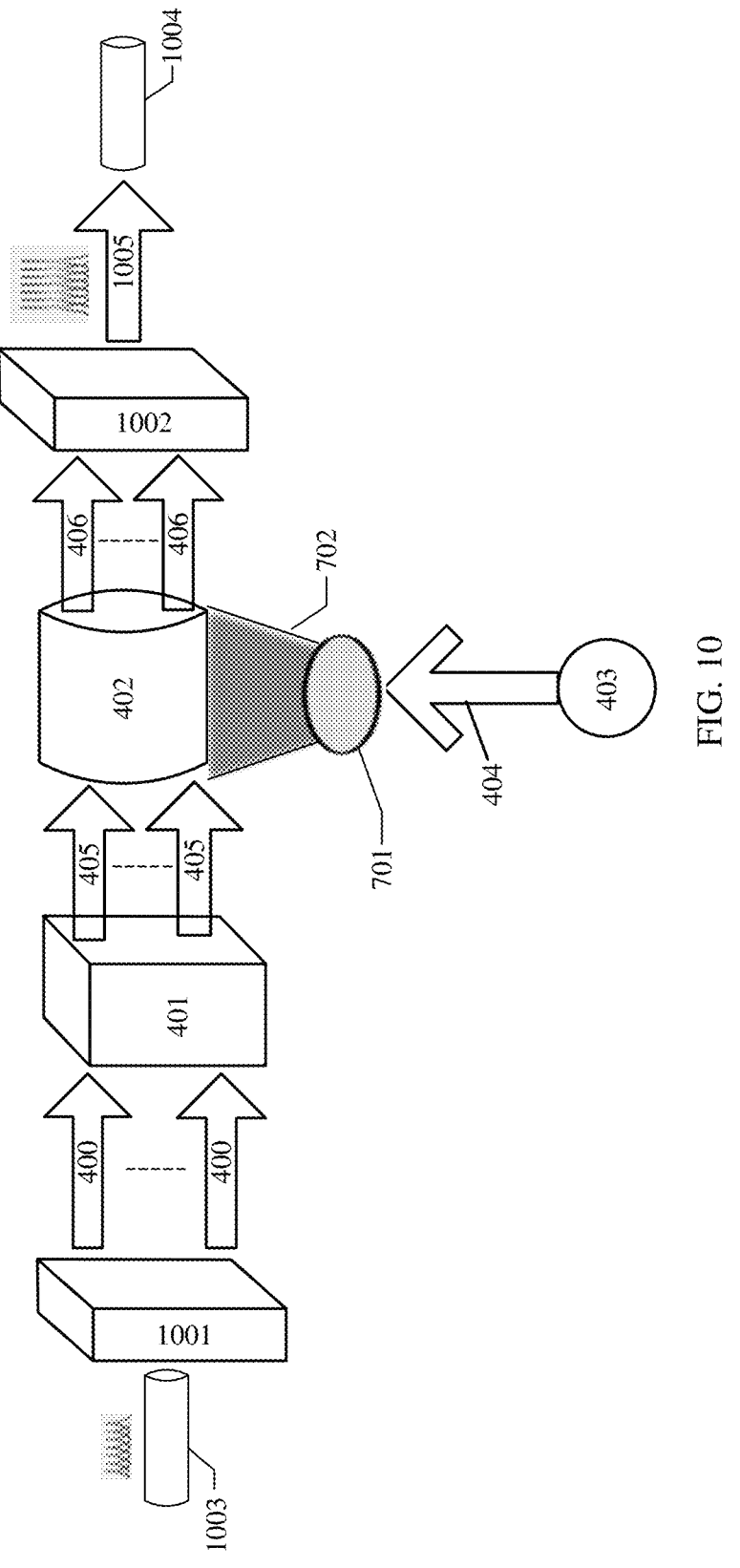
FIG. 10 is a diagram of an example of a fifth embodiment of a gain adjuster according to embodiments of this application.

The following describes another embodiment of the gain adjuster provided in this application with reference to FIG. 10. Specifically, the gain adjuster shown in this embodiment can separately adjust gains of a plurality of channels of to-be-adjusted optical signals.

The gain adjuster specifically includes the light spot conversion component 401, the gain medium 402, the light spot conversion component 407, and the pump laser 403. For specific description, refer to FIG. 7 for details. Details are not described again. It should be noted that side-face excitation performed on the gain medium 402 is used as an example for description in this embodiment. In another example, end-face excitation may be alternatively performed on the gain medium 402. For specific description of the end-face excitation, refer to FIG. 8 for details. Details are not described again.

In the transmission direction of the optical axis of the to-be-adjusted optical signal 400, a first beam conversion component 1001, the light spot conversion component 401, the gain medium 402, and a second beam conversion component 1002 are sequentially coupled.

The first beam conversion component 1001 is configured to receive a channel of a wavelength division multiplexing signal from an optical fiber 1003.

The first beam conversion component 1001 is further configured to divide the wavelength division multiplexing signal to output a plurality of channels of to-be-adjusted optical signals 400 with different wavelengths. This embodiment does not limit a component type of the first beam conversion component 1001, provided that the first beam conversion component 1001 can spatially divide the to-be-adjusted optical signals 400 with different wavelengths. For example, the first beam conversion component 1001 may be a grating.

The light spot conversion component 401 may separately adjust light spot sizes of a plurality of channels of obtained to-be-adjusted optical signals 400 to output a plurality of channels of first optical signals 405. In this embodiment, the light spot conversion component 401 may be a microlens array, or the like. For description of a process in which the light spot conversion component 401 adjusts the light spot size of the to-be-adjusted optical signal 400, refer to any one of the foregoing embodiments. Details are not described again.

The gain medium 402 shown in this embodiment can separately adjust a gain of each channel of a first optical signal to output a plurality of channels of second optical signals 405. For a specific process, refer to any one of the foregoing embodiments. Details are not described again.

The gain medium 402 outputs the plurality of channels of second optical signals 405 to the second beam conversion component 1002. The second beam conversion component 1002 is configured to multiplex the plurality of channels of second optical signals 405 to output a multiplexed second optical signal 1005. An optical fiber 1004 may be configured to transmit the multiplexed second optical signal 1005. This embodiment does not limit a specific quantity of second optical signals 1005 and a specific quantity of optical fibers 1004. For example, the quantity of second optical signals 1005 and the quantity of optical fibers 1004 are both one. For another example, if the second beam conversion component 1002 outputs two channels of multiplexed second optical signals 1005, the two channels of multiplexed second optical signals 1005 are separately transmitted by using two optical fibers 1004.

A component type of the first beam conversion component 1001 and that of the second beam conversion component 1002 are not limited in this embodiment. For example, the beam conversion component may be a diffraction grating, a prism, or a waveguide.

The gain adjuster shown in this embodiment can separately adjust gains of the plurality of channels of optical signals. It can be learned that when no component needs to be added, the gains of the plurality of channels of first optical signals 400 can be separately adjusted by using the disposed gain medium, which effectively reduces the costs and a volume of the gain adjustment component and further effectively improves a pooling adjustment capability of adjusting the gains of the plurality of channels of to-be-adjusted optical signals 400.

Because the gain adjuster shown in this embodiment implements gain adjustment through adjusting the light spot size of the to-be-adjusted optical signal 400, an insertion loss of wavelength dependence between the plurality of channels of to-be-adjusted optical signals with different wavelengths in a gain adjustment process is effectively avoided. In addition, a power imbalance problem of the to-be-adjusted optical signals with different wavelengths is avoided, and a problem such as deterioration of an optical signal noise ratio (OSNR) is effectively avoided.

Figure 11:
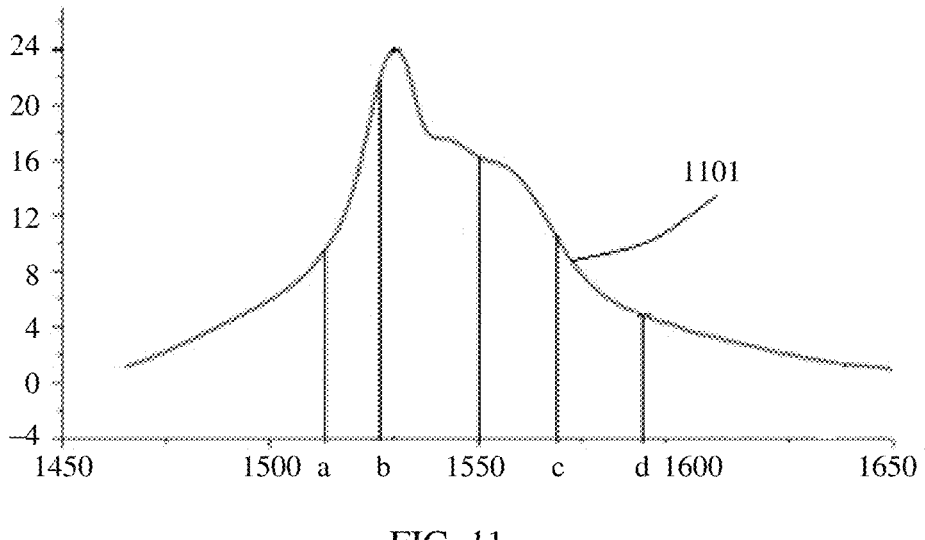
FIG. 11 is a diagram of an example of a gain curve according to embodiments of this application.

Optionally, the gain adjuster shown in this embodiment can further implement flat output of gains, thereby avoiding performance deterioration such as a noise coefficient. FIG. 11 is used as an example. FIG. 11 is an example diagram of a gain curve. The gain medium is further configured to perform gain adjustment based on the gain curve 1101. A horizontal coordinate of the gain curve 1101 is a wavelength, and a vertical coordinate of the gain curve 1101 is a gain. It can be learned from the gain curve 1101 that, for the optical signals with different wavelengths, the gain medium may output optical signals with different gains based on the gain curve 1101. The following describes a process of implementing flat output of gains of a plurality of channels of to-be-adjusted optical signals.

First, a target to-be-adjusted optical signal is determined from the plurality of channels of to-be-adjusted optical signals. For example, as shown in FIG. 11, four channels of to-be-adjusted optical signals include a to-be-adjusted optical signal a to a to-be-adjusted optical signal d. Gain values respectively corresponding to the four channels of to-be-adjusted optical signals are determined based on the gain curve 1101. The target to-be-adjusted optical signal corresponds to a maximum value in the gain values respectively corresponding to the four channels of to-be-adjusted optical signals. As shown in FIG. 11, it can be learned that the gain value corresponding to the to-be-adjusted optical signal b is the largest, and the to-be-adjusted optical signal b is the target to-be-adjusted optical signal.

Then, a target light spot size is determined. A light spot size of the target to-be-adjusted optical signal b is the target light spot size.

Further, a preset focal length is determined based on the target light spot size. The light spot conversion component 401 can adjust a light spot size of a to-be-adjusted optical signal to the target light spot size based on the preset focal length.

As shown in this example, when the gain adjuster needs to adjust a plurality of channels of to-be-adjusted optical signals, a light spot size of each channel of a to-be-adjusted optical signal may be adjusted to the target light spot size, so that gain values of a plurality of channels of second optical signals output by the gain medium are the gain value of the target to-be-adjusted optical signal. It can be learned that the gain adjuster shown in this embodiment can implement flat output of gains. In this embodiment, flat output of gains can be implemented without introducing additional components. For example, it is unnecessary to introduce a gain flattening filter (GFF). The GFF is configured to filter out a high-gain signal in a passive manner to implement gain balance. The gain adjuster shown in this embodiment can further implement flat output of gains through adjusting a light spot size, thereby avoiding performance deterioration such as a noise coefficient.

Figure 12:
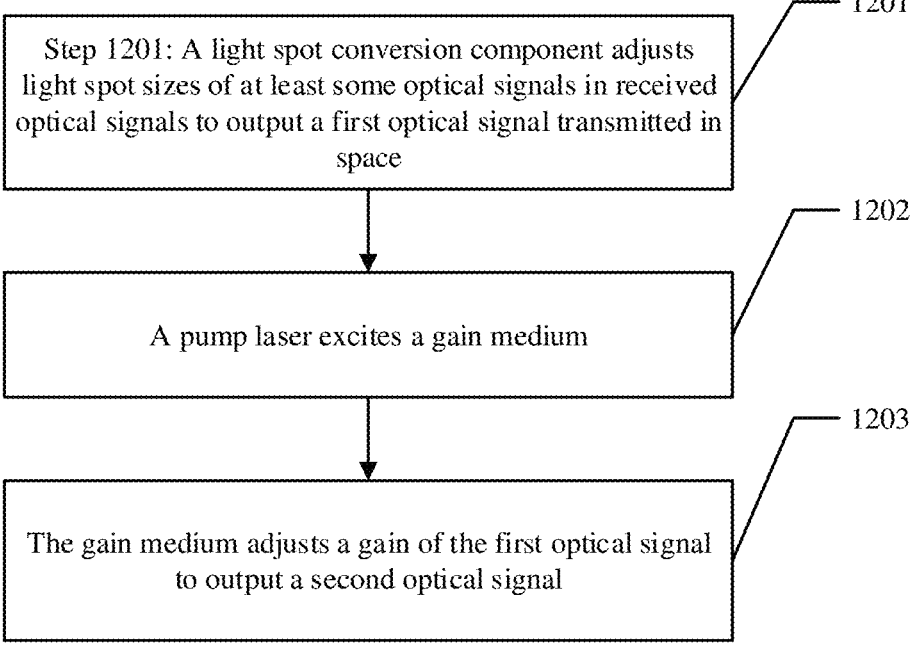
FIG. 12 is a flowchart of steps in a first embodiment of a gain adjustment method according to embodiments of this application.

With reference to FIG. 12, the following describes an example of a specific execution process of the gain adjustment method provided in this embodiment. For description of a specific structure of the gain adjuster configured to perform the gain adjustment method shown in this embodiment, refer to FIG. 4 for details. Details are not described again.

Step 1201: A light spot conversion component adjusts light spot sizes of at least some optical signals in received optical signals to output a first optical signal transmitted in space.

Step 1202: A pump laser excites a gain medium.

Step 1203: The gain medium adjusts a gain of the first optical signal to output a second optical signal.

For description of a specific execution process of step 1201 to step 1203 shown in this embodiment, refer to the foregoing description of performing gain adjustment on a to-be-adjusted optical signal by the gain adjuster shown in FIG. 4. Details are not described again. For description of beneficial effects obtained when the gain adjuster shown in this embodiment performs the gain adjustment method, refer to FIG. 4 for details. Details are not described again.

Figure 13:
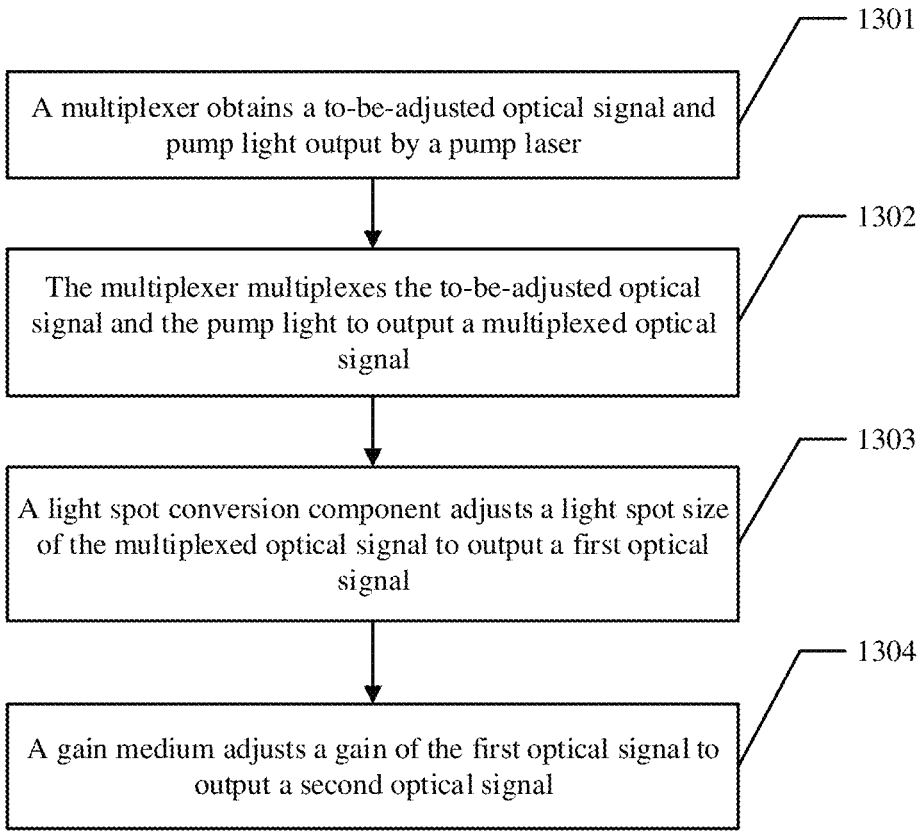
FIG. 13 is a flowchart of steps in a second embodiment of a gain adjustment method according to embodiments of this application.

The following describes another embodiment of the gain adjustment method provided in this embodiment with reference to FIG. 13. In this embodiment, a negative correlation exists between a gain magnitude of the second optical signal that is adjusted by the gain adjuster and a light spot size of pump light.

Step 1301: A multiplexer obtains a to-be-adjusted optical signal and pump light output by a pump laser.

Step 1302: The multiplexer multiplexes the to-be-adjusted optical signal and the pump light to output a multiplexed optical signal.

Step 1303: A light spot conversion component adjusts a light spot size of the multiplexed optical signal to output a first optical signal.

Step 1304: A gain medium adjusts a gain of the first optical signal to output a second optical signal.

For description of a specific execution process of step 1301 to step 1304 shown in this embodiment, refer to the foregoing description of performing gain adjustment on a to-be-adjusted optical signal by the gain adjuster shown in FIG. 5. Details are not described again. For description of beneficial effects obtained when the gain adjuster shown in this embodiment performs the gain adjustment method, refer to FIG. 5 for details. Details are not described again.

Figure 14:
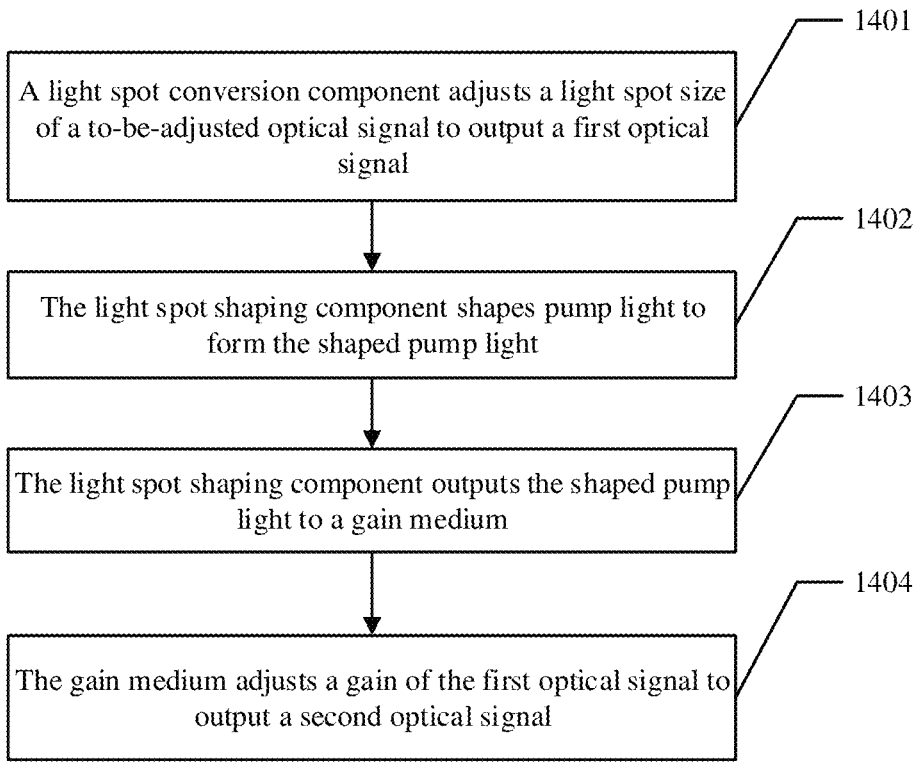
FIG. 14 is a flowchart of steps in a third embodiment of a gain adjustment method according to embodiments of this application.

The following describes another embodiment of the gain adjustment method provided in this embodiment with reference to FIG. 14. In this embodiment, a positive correlation exists between a gain magnitude of the second optical signal that is adjusted by the gain adjuster and a light spot size of the first optical signal.

Step 1401: A light spot conversion component adjusts a light spot size of a to-be-adjusted optical signal to output a first optical signal.

Step 1402: The light spot shaping component shapes pump light to form the shaped pump light.

Step 1403: The light spot shaping component outputs the shaped pump light to again medium.

Step 1404: The gain medium adjusts a gain of a first optical signal to output a second optical signal.

For description of a specific execution process of step 1401 to step 1404 shown in this embodiment, refer to the foregoing description of performing gain adjustment on a to-be-adjusted optical signal by the gain adjuster shown in FIG. 7. Details are not described again. For description of beneficial effects obtained when the gain adjuster shown in this embodiment performs the gain adjustment method, refer to FIG. 7 for details. Details are not described again.

Figure 15:
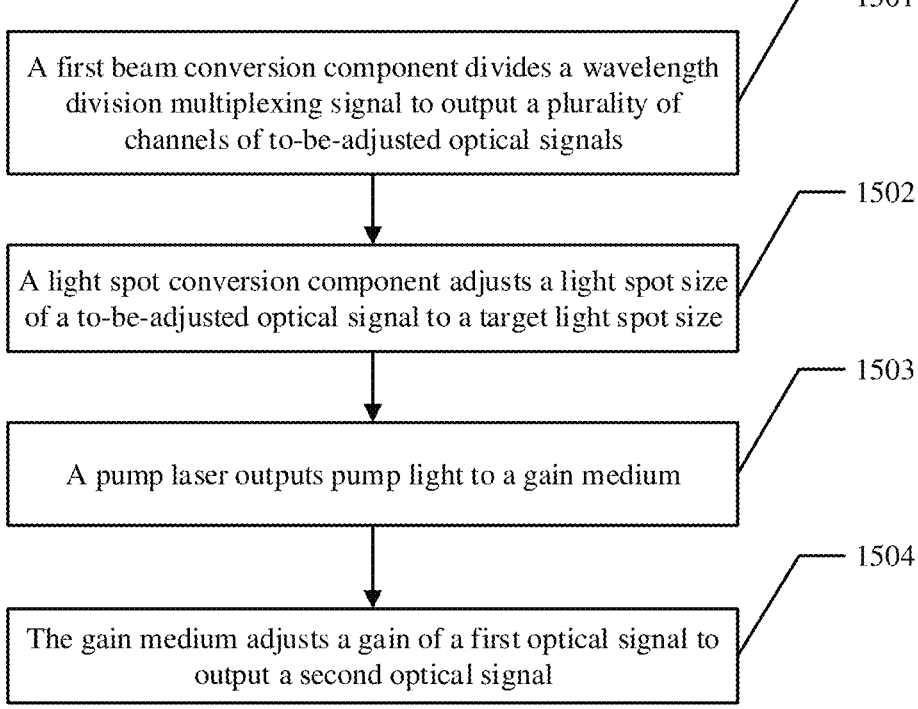
FIG. 15 is a flowchart of steps in a fourth embodiment of a gain adjustment method according to embodiments this application.

The following describes another embodiment of the gain adjustment method provided in this embodiment with reference to FIG. 15. In this embodiment, a gain adjuster can separately adjust gains of a plurality of channels of to-be-adjusted optical signals.

Step 1501: A first beam conversion component divides a wavelength division multiplexing signal to output a plurality of channels of to-be-adjusted optical signals.

Step 1502: A light spot conversion component adjusts a light spot size of a to-be-adjusted optical signal to a target light spot size.

Step 1503: A pump laser outputs pump light to a gain medium.

Step 1504: The gain medium adjusts a gain of a first optical signal to output a second optical signal.

For description of a specific execution process of step 1501 to step 1504 shown in this embodiment, refer to the foregoing description of performing gain adjustment on a plurality of channels of to-be-adjusted optical signals by the gain adjuster shown in FIG. 10 and FIG. 11. Details are not described again. For description of beneficial effects obtained when the gain adjuster shown in this embodiment performs the gain adjustment method, refer to FIG. 10 and FIG. 11 for details. Details are not described again.

This application further provides an optical line terminal using a gain adjuster. The optical line terminal includes the gain adjuster shown in any one of the embodiments of FIG. 4, FIG. 5, FIG. 7, FIG. 8, and FIG. 12. It can be learned that the gain adjuster is configured to adjust a gain of a received optical signal (that is, the to-be-adjusted optical signal shown in the foregoing embodiment). For specific description of the optical line terminal, refer to FIG. 2 for details. Details are not described again.

This application further provides a wavelength selective switch. The wavelength selective switch includes the gain adjuster shown in any one of the embodiments of FIG. 4, FIG. 5, FIG. 7, FIG. 8, and FIG. 12. For specific description of the wavelength selective switch, refer to FIG. 3 for details. Details are not described again.

In the specification, claims, and accompanying drawings of this application, the terms such as "first" and "second" are intended to distinguish between similar objects but do not necessarily indicate a specific order or sequence. It should be understood that data used in such a way is interchangeable in appropriate circumstances, so that embodiments described herein can be implemented in other orders than the order illustrated or described herein. In addition, the terms "include", "have", and any other variants are intended to cover non-exclusive inclusions, for example, a process, method, system, product, or device including a series of steps or modules is not necessarily limited to those clearly listed steps or modules, but may include other steps or modules that are not clearly listed or are inherent to such a process, method, product, or device.

In the several embodiments provided in this application, it should be understood that the disclosed system, apparatus, and method may be implemented in another manner. For example, the apparatus embodiment described above is merely an example. For example, a plurality of units or components may be combined or integrated into another system, or some features may be ignored or not performed.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of the present invention.

What is claimed is:

1. A gain adjuster, comprising:

a light spot conversion component and a gain medium that are sequentially coupled; and a pump laser, wherein, the light spot conversion component is configured to adjust light spot sizes of at least some optical signals in received optical signals to output a first optical signal transmitted in space;

the pump laser is configured to excite the gain medium;

the gain medium is configured to adjust, when exited by the pump laser, a gain of the first optical signal to output a second optical signal; and wherein the first optical signal is incident on the gain medium at a first location, light from the pump laser is incident on the gain medium at a second location, and the second optical signal is output from the gain medium at a third location, and the first location, the second location, and the third location are different locations.

2. The gain adjuster according to claim 1, wherein the pump laser is coupled to the gain medium, and the pump laser is located in a region opposite to a side face of the gain medium; and wherein the pump laser is configured to output a pump light to perform side-face excitation on the gain medium using the pump light.

3. The gain adjuster according to claim 2, wherein the gain adjuster further comprises a light spot shaping component coupled between the gain medium and the pump laser; and the light spot shaping component is configured to shape the pump light to form a shaped pump light, the shaped pump light being used to excite the gain medium, and wherein the shaped pump light forms a pump light radiation region, and the gain medium is located in the pump light radiation region.

4. The gain adjuster according to claim 1, wherein the pump laser is coupled to the gain medium, and the pump laser is located in a region opposite to an end face of the gain medium; and wherein the pump laser is configured to output a pump light to perform end-face excitation on the gain medium using the pump light.

5. The gain adjuster according to claim 1, wherein a light spot size of the first optical signal is positively correlated with a gain magnitude of the second optical signal.

6. The gain adjuster according to claim 1, wherein the gain adjuster further comprises a first beam conversion component and a second beam conversion component, the first beam conversion component, the light spot conversion component, the gain medium, and the second beam conversion component being sequentially coupled;

the first beam conversion component is configured to divide a wavelength division multiplexing signal to output a plurality of channels of to-be-adjusted optical signals;

the light spot conversion component is further configured to separately adjust light spot sizes of the plurality of channels of to-be-adjusted optical signals to output a plurality of channels of first optical signals, wherein the at least some optical signals comprise the plurality of channels of to-be-adjusted optical signals;

the gain medium is further configured to separately adjust gains of the plurality of channels of first optical signals to output a plurality of channels of second optical signals; and the second beam conversion component is configured to multiplex the plurality of channels of second optical signals.

7. The gain adjuster according to claim 6, wherein each of the plurality of channels of to-be-adjusted optical signals corresponds to a gain value in a gain curve, and the light spot conversion component is further configured to adjust a light spot size of each of the plurality of channels of to-be-adjusted optical signals to obtain a target light spot size, wherein the target light spot size is a light spot size of a to-be-adjusted optical signal corresponding to a maximum value in a plurality of gain values, and the gain medium is configured to perform gain adjustment based on the gain curve.

8. The gain adjuster according to claim 1, wherein the light spot conversion component is configured to adjust the light spot sizes of the at least some optical signals based on a preset focal length, the preset focal length corresponding to wavelengths of the at least some optical signals.

9. A method applied to a gain adjuster, comprising:

adjusting, by a light spot conversion component of the gain adjuster, light spot sizes of at least some optical signals in received optical signals to output a first optical signal transmitted in space;

exciting, by a pump laser of the gain adjuster, a gain medium of the gain adjuster; and adjusting, by the gain medium when excited by the pump laser, a gain of the first optical signal to output a second optical signal; and wherein the first optical signal is incident on the gain medium at a first location, light from the pump laser is incident on the gain medium at a second location, and the second optical signal is output from the gain medium at a third location, and the first location, the second location, and the third location are different locations.

10. The method according to claim 9, further comprising:

shaping, by a light spot shaping component coupled between the gain medium and the pump laser, a pump light to form a shaped pump light, the pump light being generated by the pump laser, and the shaped pump light being used to excite the gain medium, wherein the shaped pump light forms a pump light radiation region, and the gain medium is located in the pump light radiation region.

11. The method according to claim 9, wherein a light spot size of the first optical signal is positively correlated with a gain magnitude of the second optical signal.

12. An optical line terminal comprising:

a gain adjuster connected to a passive optical splitter through a feeder fiber, the gain adjuster being configured to adjust a gain of a received optical signal, and the gain adjuster comprising:

a light spot conversion component and a gain medium that are sequentially coupled; and a pump laser; and wherein the light spot conversion component is configured to adjust light spot sizes of at least some optical signals in received optical signals to output a first optical signal transmitted in space; the pump laser is configured to excite the gain medium; and the gain medium is configured to adjust, when exited by the pump laser, a gain of the first optical signal to output a second optical signal.

13. The optical line terminal according to claim 12, wherein the pump laser is coupled to the gain medium, and the pump laser is located in a region opposite to a side face of the gain medium; and wherein the pump laser is configured to output a pump light to perform side-face excitation on the gain medium using the pump light; or the pump laser is coupled to the gain medium, and the pump laser is located in a region opposite to an end face of the gain medium; and wherein the pump laser is configured to output a pump light to perform end-face excitation on the gain medium using the pump light.

14. The optical line terminal according to claim 13, wherein the gain adjuster further comprises a light spot shaping component coupled between the gain medium and the pump laser; and the light spot shaping component is configured to shape the pump light to form a shaped pump light, the shaped pump light being used to excite the gain medium, and wherein the shaped pump light forms a pump light radiation region, and the gain medium is located in the pump light radiation region.

15. The optical line terminal according to claim 12, wherein a light spot size of the first optical signal is positively correlated with a gain magnitude of the second optical signal.

16. The optical line terminal according to claim 12, wherein the gain adjuster further comprises a first beam conversion component and a second beam conversion component, the first beam conversion component, the light spot conversion component, the gain medium, and the second beam conversion component being sequentially coupled;

the first beam conversion component is configured to divide a wavelength division multiplexing signal to output a plurality of channels of to-be-adjusted optical signals;

the light spot conversion component is further configured to separately adjust light spot sizes of the plurality of channels of to-be-adjusted optical signals to output a plurality of channels of first optical signals, wherein the at least some optical signals comprise the plurality of channels of to-be-adjusted optical signals;

the gain medium is further configured to separately adjust gains of the plurality of channels of first optical signals to output a plurality of channels of second optical signals; and the second beam conversion component is configured to multiplex the plurality of channels of second optical signals.

17. The method according to claim 9, wherein adjusting, by the light spot conversion component of the gain adjuster, the light spot sizes of the at least some optical signals in the received optical signals comprises:

adjusting the light spot sizes of the at least some optical signals based on a preset focal length, the preset focal length corresponding to wavelengths of the at least some optical signals.

18. The gain adjuster according to claim 1, wherein the gain adjuster is configured to connect to a feeder fiber.

19. The gain adjuster according to claim 1, wherein the gain adjuster is configured to adjust a gain of a signal input to a liquid crystal on silicon (LCoS) panel.

* * * * *